United States Patent
Fukushima et al.

(10) Patent No.: US 8,134,544 B2
(45) Date of Patent: Mar. 13, 2012

(54) DISPLAY DEVICE

(75) Inventors: Hiroshi Fukushima, Yamatokoriyama (JP); Tomoo Takatani, Nara (JP); Koji Yabuta, Kashiba (JP); Yoshihide Koyama, Matsusaka (JP); Akira Imai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1070 days.

(21) Appl. No.: 11/993,354

(22) PCT Filed: Jun. 5, 2006

(86) PCT No.: PCT/JP2006/311194
§ 371 (c)(1),
(2), (4) Date: Dec. 20, 2007

(87) PCT Pub. No.: WO2007/007483
PCT Pub. Date: Jan. 18, 2007

(65) Prior Publication Data
US 2010/0149136 A1 Jun. 17, 2010

(30) Foreign Application Priority Data
Jul. 11, 2005 (JP) .................................. 2005-202285

(51) Int. Cl.
*G09G 5/00* (2006.01)
(52) U.S. Cl. ........................... 345/204; 359/462; 348/51
(58) Field of Classification Search .................. 345/204; 348/51–56; 359/462, 463
See application file for complete search history.

(56) References Cited

U.S. PATENT DOCUMENTS

2005/0046951 A1* 3/2005 Sugihara et al. .............. 359/619
2007/0018585 A1* 1/2007 Ijzerman et al. ................ 315/15

FOREIGN PATENT DOCUMENTS

| GB | 2 405 542 A | 3/2005 |
| GB | 2 405 543 A | 3/2005 |
| JP | 10-301499 A | 11/1998 |
| JP | 2000-137443 A | 5/2000 |
| WO | 2005/031444 A2 | 4/2005 |

OTHER PUBLICATIONS

Official communication issued in the International Application No. PCT/JP2006/311194; mailed on Sep. 5, 2006.
Official Communication issued in corresponding European Patent Application No. 06747174.8, mailed on Feb. 23, 2011.

* cited by examiner

*Primary Examiner* — Alexander Eisen
*Assistant Examiner* — Kenneth B Lee, Jr.
(74) *Attorney, Agent, or Firm* — Keating & Bennett, LLP

(57) ABSTRACT

In a display device, when a first image is an absolute white image, a direction in which a luminance is maximum is regarded as a main viewing direction for the first image. A luminance Ld in the main viewing direction for the first image in cases where the first image is an absolute black image and other image is an absolute white image, and a luminance Lb in the main viewing direction for the first image in cases where the first image and the other image are absolute black images satisfy a relationship represented by Formula (1):

$$(Ld-Lb)/Lb \leq 2.5 \qquad (1).$$

This makes it possible to realize a display device, which is capable of displaying different images to a plurality of different viewpoints and has an improved function of separating the images in the different display directions.

6 Claims, 10 Drawing Sheets

DISPLAY DEVICE

BACKGROUND OF THE INVENTION

1. Field of the Invention

The present invention relates to a display device for displaying different images on one display screen in a plurality of directions, respectively.

2. Description of the Related Art

Conventionally, there has been proposed a display device capable of displaying different images on one display screen in a plurality of directions, respectively. Such a way of displaying is also referred to as "DV (dual view) display". FIG. 11 is a cross sectional view schematically illustrating one example of such a display device. The display device shown in FIG. 11 includes a display panel 110, a barrier section 120, a backlight 130, and polarizing plates 141 and 142.

The backlight 130 includes a light source 131 and a reflecting section 132. The light source 131 emits light, and the reflecting section 132 reflects the light, with the result that light is irradiated onto the display panel 110. The display panel 110 is an active matrix liquid crystal display panel in which a liquid crystal layer 113 is sandwiched between a TFT substrate 111 and a CF substrate 112 arranged face to face with each other.

Provided on the TFT substrate 111 are a plurality of data signal lines and a plurality of scan signal lines respectively crossing the data signal lines. For combinations of the data signal lines and the scan signal lines, pixels are respectively provided (none of them is illustrated). Further, each of the data signal lines is connected to a source driver, and each of the scan signal lines is connected to a gate driver (none of them is illustrated). With this arrangement, when driving voltages are applied independently to the pixels, alignment conditions of liquid crystal molecules in pixel regions of the liquid crystal layer 113 are changed. In this way, a display operation is carried out.

The pixels are arranged in such a manner that pixel columns L and pixel columns R alternate with each other. Each of the pixel columns L extends in the direction in which the data signal lines extend and is used to display an image to the left side (image display for the left side with respect to the display device). Each of the pixel columns R is used to display an image to the right side (image display for the right side with respect to the display device).

Meanwhile, on the CF (color filter) substrate 112, a color filter layer (not shown) is provided.

The TFT substrate 111 and the CF substrate 112 have surfaces opposing to each other and provided with alignment films (not shown) having been subjected to alignment treatments carried out in directions orthogonal to each other. The alignment films have been subjected to a rubbing treatment carried out in a direction parallel to the surfaces of the substrates respectively.

The polarizing plate 141 is provided on the backlight 130 side of the TFT substrate 111 such that the absorption axis thereof is parallel to the direction in which the alignment treatment has been carried out with respect to the alignment film provided on the TFT substrate 111. Further, the polarizing plate 142 is provided on the side opposite to the display surface side (backlight 130 side) of the barrier section 120 such that the absorption axis thereof is orthogonal to the absorption axis of the polarizing plate 141. With this arrangement, driving voltages to be applied to the pixels are varied such that an image can be displayed on each of the pixel columns in its display direction.

The barrier section 120 is made up of a barrier glass 121, barrier light-blocking layers 122, and an adhesive layer 123. The barrier light-blocking layers 122 block light irradiated from the backlight 130 and having passed through the display panel 110. The adhesive layer 123 is formed on the barrier glass 121 so as to cover the barrier light-blocking layers 122, thus adhering the barrier section 120 to the display panel 110.

Further, the barrier light-blocking layers 122 are provided in lines in a stripe manner so as to correspond to the pixel columns respectively. That is, the barrier light-blocking layers 122 are provided to block light, irradiated from the backlight 130 and having passed through the pixel columns, such that the pixel columns L for the left side can be viewed from the left side with respect to the display device but cannot be viewed from the right side and the pixel columns R for the right side can be viewed from the right side with respect to the display device but cannot be viewed from the left side. With this, the display device is capable of displaying different images for the left side and the right side with respect to the display device respectively (DV display).

For example, Japanese Tokukai 2000-137443 discloses a display device used in a vehicle to simultaneously present different information to a driver and one in the passenger seat via a single display screen.

However, it is found that the display device suffers from such a problem that, e.g., an image for the passenger seat side overlaps with an image for the driver seat side and the overlapped images are therefore viewed and recognized, i.e., suffers from occurrence of "cross talk".

Specifically, a barrier light-blocking layer formed in the same way as a resin light-blocking film for a color filter does not sufficiently block light of an image to be displayed for the passenger seat side, with the result that the light is leaked to the driver seat side. Further, a barrier light-blocking layer constituted by a metal light-blocking film unnecessarily reflects light, with the result that light of an image to be displayed for the passenger seat side goes into the driver seat side. Accordingly, overlapped images are viewed and recognized.

In order to solve the problem, the inventors of the present application discovered the need for a display device that is capable of displaying different images to a plurality of different viewpoints to have a function of separating images so as to prevent irradiated light in a certain display direction from leaking in other display directions.

SUMMARY OF THE INVENTION

In order to overcome the problems described above, preferred embodiments of the present invention improve a function of separating images in a plurality of display directions in a display device configured to display different images on one display screen in the display directions respectively.

According to a preferred embodiment of the present invention, a display device, which is capable of displaying different images to a plurality of different viewpoints, in cases where a first image is an absolute white image, a direction in which a luminance is maximum being regarded as a main viewing direction for the first image, a luminance Ld in the main viewing direction for the first image in cases where the first image is an absolute black image and other image is an absolute white image, and a luminance Lb in the main viewing direction for the first image in cases where the first image and the other image are absolute black images satisfying a relationship represented by Formula (1):

$$(Ld-Lb)/Lb \leq 2.5 \qquad (1).$$

According to the above structure, the display device according to a preferred embodiment of the present invention is to display different images to a plurality of different viewpoints. In other words, the display device according to a preferred embodiment of the present invention is a display device capable of displaying different images for viewing angles. Further, in a preferred embodiment of the present invention, the direction in which the luminance is maximum in cases where the first image is an absolute white image is regarded as the main viewing direction for the first image.

Here, the "absolute white image" refers to a pure white image, and a phrase "displayed image is an absolute white image" indicates that such a pure white image is entirely displayed on the screen. Likewise, the "absolute black image" refers to a pure black image, and a phrase "displayed image is an absolute black image" indicates that such a pure black image is entirely displayed on the screen. Further, the phrase "direction in which the luminance is maximum" refers to a direction in which the luminance is maximum (brightness is maximum) on the screen in cases where the absolute white image is displayed, and is a direction in which an image can be viewed with the maximum luminance (maximum brightness), among all the viewing angles with respect to the screen. Further, the term "first image" encompasses images viewable from a viewpoint from which the first image is viewable. Examples of such images include an absolute white image, an absolute black image, a moving image, a still image, and the like, and are not particularly limited. Further, the term "other image" encompasses images that are not normally viewable from the viewpoint from which the first image is viewable.

Further, Ld represents the luminance in the main viewing direction for the first image in cases where the first image is an absolute black image and the other image is an absolute white image. Further, Lb represents a luminance in the main viewing direction for the first image in cases where the first image and the other image are absolute black images. In the display device according to a preferred embodiment of the present invention, these Ld and Lb satisfy the relationships represented by Formula (1) described above.

In Formula (1), (Ld−Lb) represents a luminance of the light beam for the other image viewable in the main viewing direction for the first image. In other words, (Ld−Lb) represents a luminance of the light beam corresponding to the other image and leaking in the main viewing direction for the first image. When the first image is an absolute black image and the other image is an absolute white image, the light beam for the other image leaks into the first image most likely (cross talk occurs most likely). However, in the display device according to a preferred embodiment of the present invention, under a circumstance in which cross talk occurs most likely, the ratio of the luminance of the light beam of the first image to the luminance of the leaked light beam of the other image is not more than about 2.5 as shown in Formula (1). Thus, cross talk is sufficiently restrained from occurring. Hence, the display device according to a preferred embodiment of the present invention is a display device having an improved function of separating the images in the display directions.

A display device according to a preferred embodiment of the present invention, which is capable of displaying a first image and a second image to a plurality of different viewpoints, in cases where the first image is an absolute white image, a direction in which a luminance is maximum being regarded as a main viewing direction for the first image, a luminance Ld in the main viewing direction for the first image in cases where the first image is an absolute black image and the second image is an absolute white image, and a luminance Lb in the main viewing direction of the first image in cases where the first image and the second image are absolute black images satisfying a relationship represented by Formula (1):

$$(Ld-Lb)/Lb \leq 2.5 \tag{1}$$

According to the above structure, the display device according to a preferred embodiment of the present invention is to display the first image and the second image to a plurality of different viewpoints. That is, the display device is a display device capable of displaying two different images for viewing angles. Further, the definitions of the terms and the phrases "main viewing direction", "absolute white image", "image is an absolute white image", "absolute black image", "image is an absolute black image", "direction in which the luminance is maximum", "first image" are the same as described above. Further, the meaning of the "second image" is the same as that of the term "other image".

Further, Ld represents the luminance in the main viewing direction for the first image in cases where the first image is an absolute black image and the second image is an absolute white image. Further, Lb represents a luminance in the main viewing direction for the first image in cases where the first image and the second image are absolute black images. In the display device according to a preferred embodiment of the present invention, these examples of Ld and Lb satisfy the relationship represented by Formula (1) described above.

That is, in the display device of a preferred embodiment of the present invention, under a circumstance in which cross talk occurs the most, the ratio of the luminance of the light beam of the first image to the luminance of the leaked light beam of the second image is not more than about 2.5 as shown in Formula (1). Thus, cross talk is sufficiently restrained from occurring. Hence, the display device according to a preferred embodiment of the present invention is a display device having an improved function of separating the images in the display directions.

It is preferable that a display device according to a preferred embodiment of the present invention includes: an image generating unit arranged to generate images and emit light beams corresponding to the images thus generated; and a parallax barrier including a transmissive section through which a light beam having been emitted from the image generating unit and heading in a particular direction pass, and a barrier light-blocking section which blocks light beams heading in directions other than the particular direction, wherein a relationship represented by Formula 2 is satisfied:

$$\log(1/T) \geq 4 \tag{2}$$

where T denotes a transmittance of the barrier light-blocking section for the light beams.

According to the above structure, the image generating unit generates the images to be displayed, and emits to the parallax barrier the light beams corresponding to the images thus generated. The parallax barrier includes the transmissive section and the barrier light-blocking section. The transmissive section allows passing-through of the light beam emitted from the image generating unit (corresponding to an image) and heading in the particular direction. Meanwhile, the barrier light-blocking section blocks the light beams heading in the other directions. In this way, the plurality of images are separated in their display directions respectively, with the result that the different images are displayed toward the plurality of different viewpoints.

Note that the "light beam corresponding to an image" refers to a light beam for displaying (expressing) an image, and is a light beam having a luminance corresponding to a generated image. Further, the "particular direction" refers to a direction in which each of the images generated by the image generating unit is displayed, and is a direction in which the image is viewable.

Further, the transmittance T of the barrier light-blocking section for the light beam satisfies the relationship represented by Formula (2) described above. This allows the barrier light-blocking section to sufficiently block a light beam of an image and therefore prevent light beams, which head in directions other than the particular direction, from leaking in the particular direction. Thus, cross talk is sufficiently restrained from occurring. Hence, the display device according to a preferred embodiment of the present invention has an improved function of separating the images in the display directions.

It is preferable that the display device according to a preferred embodiment of the present invention includes: an image generating unit arranged to generate the first image and the second image and to emit light beams corresponding to the images thus generated; and a parallax barrier including a transmissive section through which a light beam having been emitted from the image generating unit and heading in a particular direction pass, and a barrier light-blocking section which blocks light beams heading in directions other than the particular direction, wherein a relationship represented by Formula 2 is satisfied:

$$\log(1/T) \geqq 4 \qquad (2)$$

where T denotes a transmittance of the barrier light-blocking section for the light beams.

According to the above structure, the image generating unit generates the first and second images to be displayed, and emits to the parallax barrier the light beams corresponding to the images thus generated. The parallax barrier includes the transmissive section and the barrier light-blocking section. The transmissive section allows passing-through of the light beam emitted from the image generating unit (corresponding to an image) and heading in the particular direction. Meanwhile, the barrier light-blocking section blocks the light beams heading in the other directions. In this way, the first and second images are separated in their display directions respectively, with the result that the first and second images are displayed toward the plurality of different viewpoints.

Further, the transmittance T of the barrier light-blocking section for the light beam satisfies the relationship represented by Formula (2) described above. This allows the barrier light-blocking section to sufficiently block a light beam of an image and therefore prevent light beams, which head in directions other than the particular direction, from leaking in the particular direction. Thus, cross talk is sufficiently restrained from occurring. Hence, the display device according to a preferred embodiment of the present invention has an improved function of separating the images in the display directions.

A display device according to another preferred embodiment of the present invention, which is capable of displaying different images to a plurality of different viewpoints, includes: an image generating unit arranged to generate images and emit light beams corresponding to the images thus generated; and a parallax barrier including a transmissive section through which a light beam having been emitted from the image generating unit and heading in a particular direction pass, and a barrier light-blocking section which blocks light beams heading in directions other than the direction, wherein: the barrier light-blocking section is made of a resin, and a relationship represented by Formula 2 is satisfied:

$$\log(1/T) \geqq 4 \qquad (2)$$

where T denotes a transmittance of the barrier light-blocking section for the light beams.

According to the above structure, the display device of a preferred embodiment of the present invention displays different images toward a plurality of different viewpoints. That is, the display device according to a preferred embodiment of the present invention is a display device capable of displaying different images for viewing angles.

Further, the barrier light-blocking section is made of a resin, and the transmittance T of the barrier light-blocking section for the light beam satisfies the relationship represented by Formula (2) described above. This allows the barrier light-blocking section to sufficiently block a light beam of an image and therefore prevent light beams, which head in directions other than the particular direction, from leaking in the particular direction, even though the barrier light-blocking section is made of a resin. Thus, cross talk is sufficiently restrained from occurring. Hence, the display device according to a preferred embodiment of the present invention has an improved function of separating the images in the display directions.

A display device according to a preferred embodiment of the present invention, which is capable of displaying a first image and a second image to a plurality of different viewpoints, includes: an image generating unit arranged to generate the first image and the second image and emitting light beams corresponding to the images thus generated; and a parallax barrier including a transmissive section through which a light beam having been emitted from the image generating unit and heading in a particular direction pass, and a barrier light-blocking section which blocks light beams heading in directions other than the direction, wherein the barrier light-blocking section is made of a resin, and a relationship represented by Formula 2 is satisfied:

$$\log(1/T) \geqq 4 \qquad (2)$$

where T denotes a transmittance of the barrier light-blocking section for the light beams.

According to the above structure, the display device of a preferred embodiment of the present invention displays the first image and the second image to a plurality of different viewpoints. That is, the display device is a display device capable of displaying two different images for different viewing angles.

Further, the barrier light-blocking section is made of a resin, and the transmittance T of the barrier light-blocking section for the light beam satisfies the relationship represented by Formula (2) described above. This allows the barrier light-blocking section to sufficiently block a light beam of an image and therefore prevent light beams, which heads in directions other than the particular direction, from leaking in the particular direction, even though the barrier light-blocking section is made of a resin. Thus, cross talk is sufficiently restrained from occurring. Hence, the display device of a preferred embodiment of the present invention has an improved function of separating the first and second images.

It is preferable to arrange the display device according to a preferred embodiment of the present invention such that a relationship represented by Formula (3) is satisfied:

$$S'/S \leqq 0.2 \qquad (3)$$

where S denotes an intensity of a light beam irradiated onto the barrier light-blocking section, and S' denotes an intensity of a light beam reflected by the barrier light-blocking section.

According to the above structure, the barrier light-blocking section has a light reflectivity of not more than about 0.2. Accordingly, light irradiated to the barrier light-blocking section can be prevented from being reflected by the barrier light-blocking section and going outside. This makes it possible to restrain occurrence of cross talk, and prevent the screen of the display device from "shining".

A display device according to a preferred embodiment of the present invention, which is capable of displaying different images to a plurality of different viewpoints, includes: an image generating unit arranged to generate images and emit light beams corresponding to the images thus generated; and a parallax barrier including a transmissive section through which a light beam having been emitted from the image generating unit and heading in a particular direction pass, and a barrier light-blocking section which blocks light beams heading in directions other than the particular direction, wherein the barrier light-blocking section includes (i) a light blocking section for blocking light, and (ii) reflection preventing sections, which prevent reflection of light and are provided on a surface, facing the image generating unit, of the light blocking section and a surface opposite to the surface facing the image generating unit, and a relationship represented by Formula 2 is satisfied:

$$\log(1/T) \geq 4 \qquad (2)$$

where T denotes a transmittance of the barrier light-blocking section for the light beams.

According to the above structure, the display device of a preferred embodiment of the present invention displays different images to a plurality of different viewpoints. In other words, the display device according to a preferred embodiment of the present invention is a display device capable of different images for viewing angles. Further, the image generating unit generates the images to be displayed, and emits to the parallax barrier the light beams corresponding to the images thus generated. The parallax barrier includes the transmissive section and the barrier light-blocking section. The transmissive section allows passing-through of the light beam heading in the particular direction. The barrier light-blocking section blocks the light beams heading in the other directions.

Further, the barrier light-blocking section includes the light blocking section arranged to block light, and the reflection preventing sections arranged to prevent reflection of light. One reflection preventing section is provided on the surface of the light blocking section so as to face the image generating unit. Further, the other reflection preventing section is provided on the other surface opposite to the surface facing the image generating unit. That is, the barrier light-blocking section is structured such that the light blocking section is sandwiched between the two reflection preventing sections. With this, the barrier light-blocking section prevents reflection of both light coming from the image generating unit side and light coming from outside.

Further, the transmittance T of the barrier light-blocking section for the light beam satisfies the relationship represented by Formula (2) described above. This allows the barrier light-blocking section to sufficiently block a light beam of an image and therefore prevent light beams, which head in directions other than the particular direction, from leaking in the particular direction. Thus, cross talk is sufficiently restrained from occurring. Hence, the display device of a preferred embodiment of the present invention has an improved function of separating the images in the display directions.

A display device according to a preferred embodiment of the present invention, which is capable of displaying a first image and a second image to a plurality of different viewpoints, includes: an image generating unit arranged to generate the first image and the second image and emitting light beams corresponding to the images thus generated; and a parallax barrier including a transmissive section through which a light beam having been emitted from the image generating unit and heading in a particular direction pass, and a barrier light-blocking section which blocks light beams heading in directions other than the particular direction, wherein the barrier light-blocking section includes (i) a light blocking section arranged to block light, and (ii) reflection preventing sections, which prevent reflection of light and are provided on a surface, facing the image generating unit, of the light blocking section and a surface opposite to the surface facing the image generating unit, and a relationship represented by Formula 2 is satisfied:

$$\log(1/T) \geq 4 \qquad (2)$$

where T denotes a transmittance of the barrier light-blocking section for the light beams.

According to the above structure, the display device of a preferred embodiment of the present invention displays the first image and the second image to a plurality of different viewpoints. That is, the display device is a display device capable of displaying two different images for different viewing angles. Further, the image generating unit generates the first and second images, and emits to the parallax barrier the light beams corresponding to the images thus generated. The parallax barrier includes the transmissive section and the barrier light-blocking section. The transmissive section allows passing-through of the light beam heading in the particular direction. The barrier light-blocking section blocks the light beams heading in the other directions.

Further, the barrier light-blocking section includes the light blocking section arranged to block light, and the reflection preventing sections arranged to prevent reflection of light. One reflection preventing section is provided on the surface of the light blocking section so as to face the image generating unit. Further, the other reflection preventing section is provided on the other surface opposite to the surface facing the image generating unit. That is, the barrier light-blocking section is structured such that the light blocking section is sandwiched between the two reflection preventing sections. With this, the barrier light-blocking section prevents reflection of both light coming from the image generating unit side and light coming from outside.

Further, the transmittance T of the barrier light-blocking section for the light beam satisfies the relationship represented by Formula (2) described above. This allows the barrier light-blocking section to sufficiently block a light beam of an image and therefore prevent light beams, which head in directions other than the particular direction, from leaking in the particular direction. Thus, cross talk is sufficiently restrained from occurring. Hence, the display device of a preferred embodiment of the present invention has an improved function of separating the images in the display directions.

It is preferable to arrange the display device according to a preferred embodiment of the present invention such that a relationship represented by Formula (3) is satisfied:

$$S'/S \leq 0.2 \qquad (3)$$

where S denotes an intensity of a light beam irradiated onto the barrier light-blocking section, and S' denotes an intensity of a light beam reflected by the barrier light-blocking section.

According to the above structure, the barrier light-blocking section has a light reflectivity of not more than about 0.2. Accordingly, light irradiated to the barrier light-blocking section can be prevented from being reflected by the barrier light-blocking section and going outside. This makes it possible to restrain occurrence of cross talk, and prevent the screen of the display device from "shining".

It is preferable to arrange the display device according to a preferred embodiment of the present invention such that the light blocking section is made of a metal. According to the above structure, it is possible to block light with ease. Further, it is preferable to arrange the display device such that each of the reflection preventing sections is made of a resin. According to the above structure, it is possible to block light with ease.

A display device according to a preferred embodiment of the present invention is a display device, which is capable of restraining occurrence of cross talk and has an improved function of separating images in their display respect directions.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be explained below with reference to FIG. 1 to FIG. 9. Exemplified in the present preferred embodiment as a display device is a display device provided in an automobile (vehicle) and capable of displaying (DV display) different images to a driver seat side and a passenger seat side, respectively. FIG. 2 is a diagram schematically illustrating a display state of the display device of a preferred embodiment of the present invention. As shown in FIG. 2, the display device is configured to carry out DV display for the driver seat side and the passenger seat side.

Figure 1:
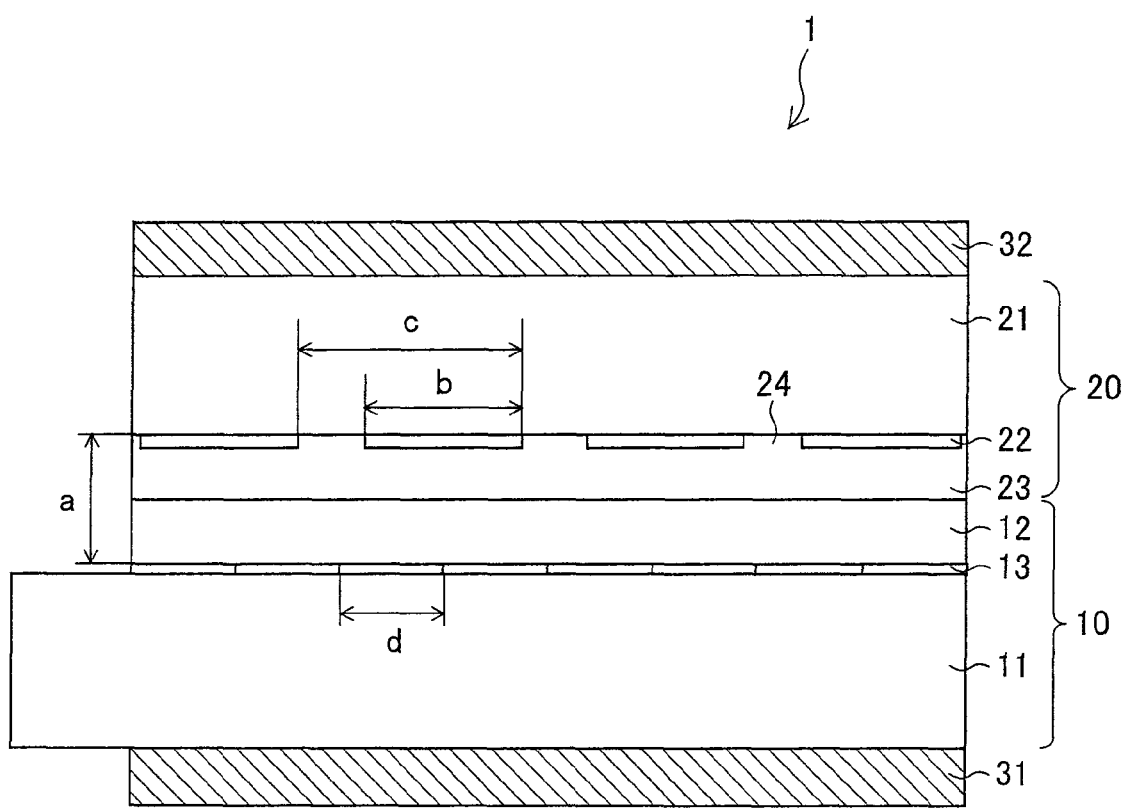
FIG. 1 illustrates a preferred embodiment of the present invention, and is a cross sectional view schematically illustrating the structure of a display device.
Figure 2:
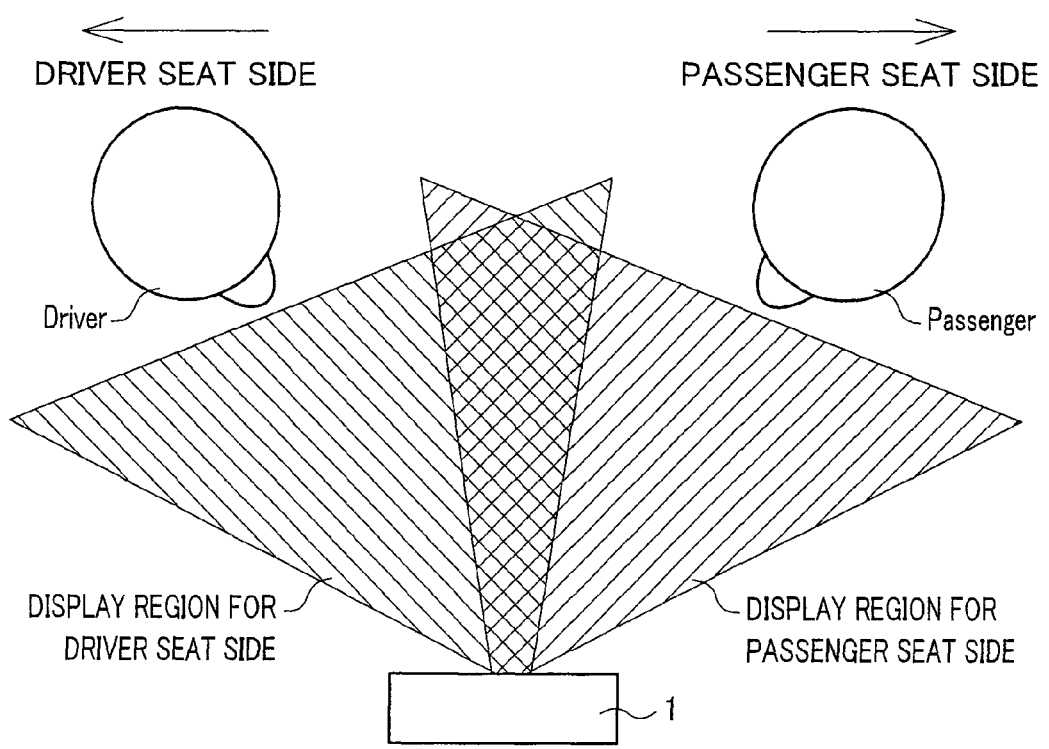
FIG. 2 illustrates a preferred embodiment of the present invention, and is a diagram schematically illustrating a display state of the display device.

FIG. 1 is a cross sectional view schematically illustrating a display device 1 according to the present preferred embodiment. As shown in FIG. 1, the display device 1 includes a display panel (image gene rating unit) 10, a barrier section 20, and polarizing plates 31 and 32. Further, the display device 1 includes a backlight (not shown), and is configured such that light from the backlight is irradiated onto the display panel 10.

The display panel 10 preferably is an active matrix liquid crystal display panel in which a liquid crystal layer (not shown) constituted by nematic liquid crystal is sandwiched between a TFT (Thin Film Transistor) substrate 11 and a CF (color filter) substrate 12 arranged face to face.

Figure 3:
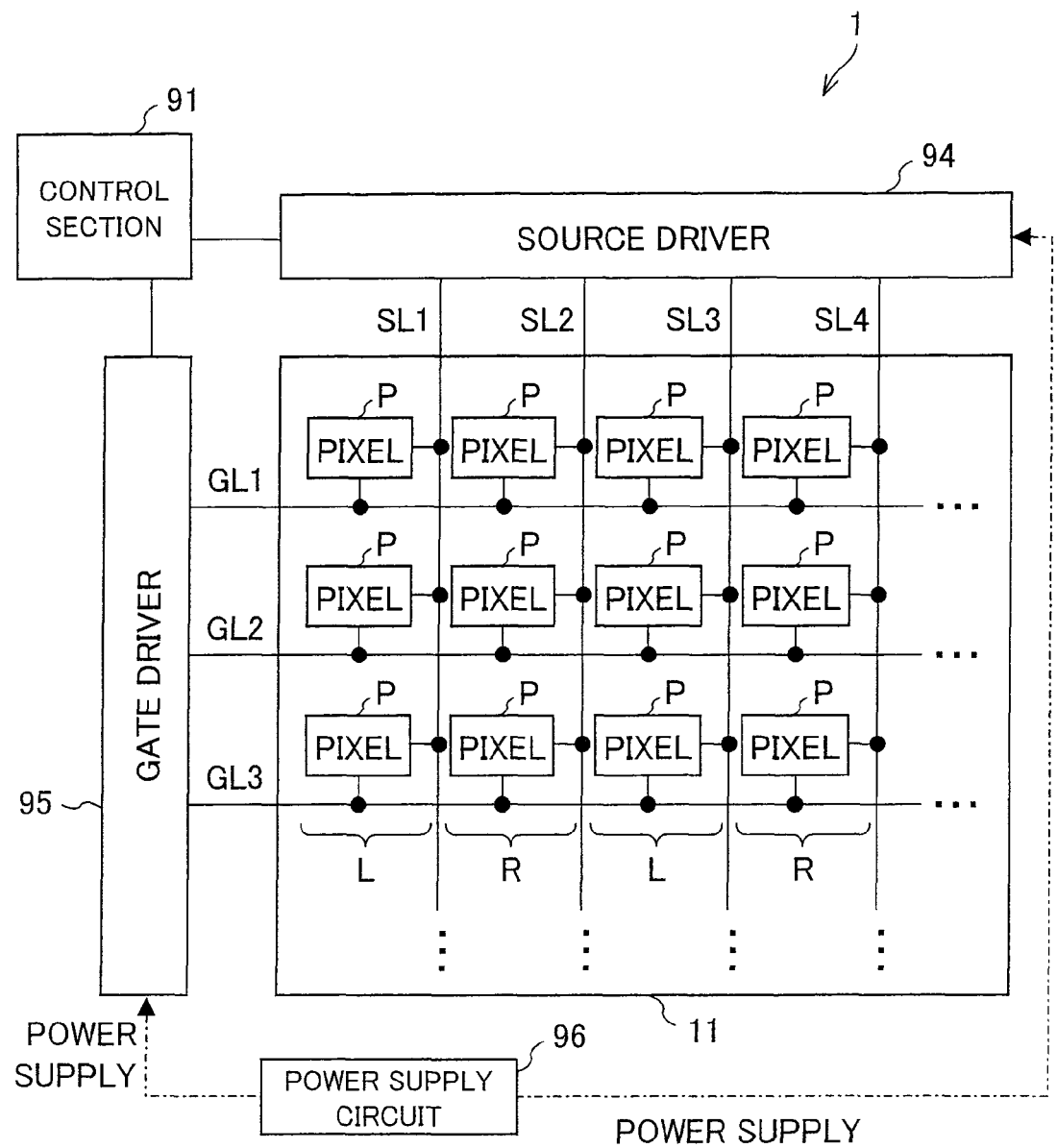
FIG. 3 illustrates a preferred embodiment of the present invention, and is a block diagram schematically illustrating the structure of a display panel.
Figure 4:
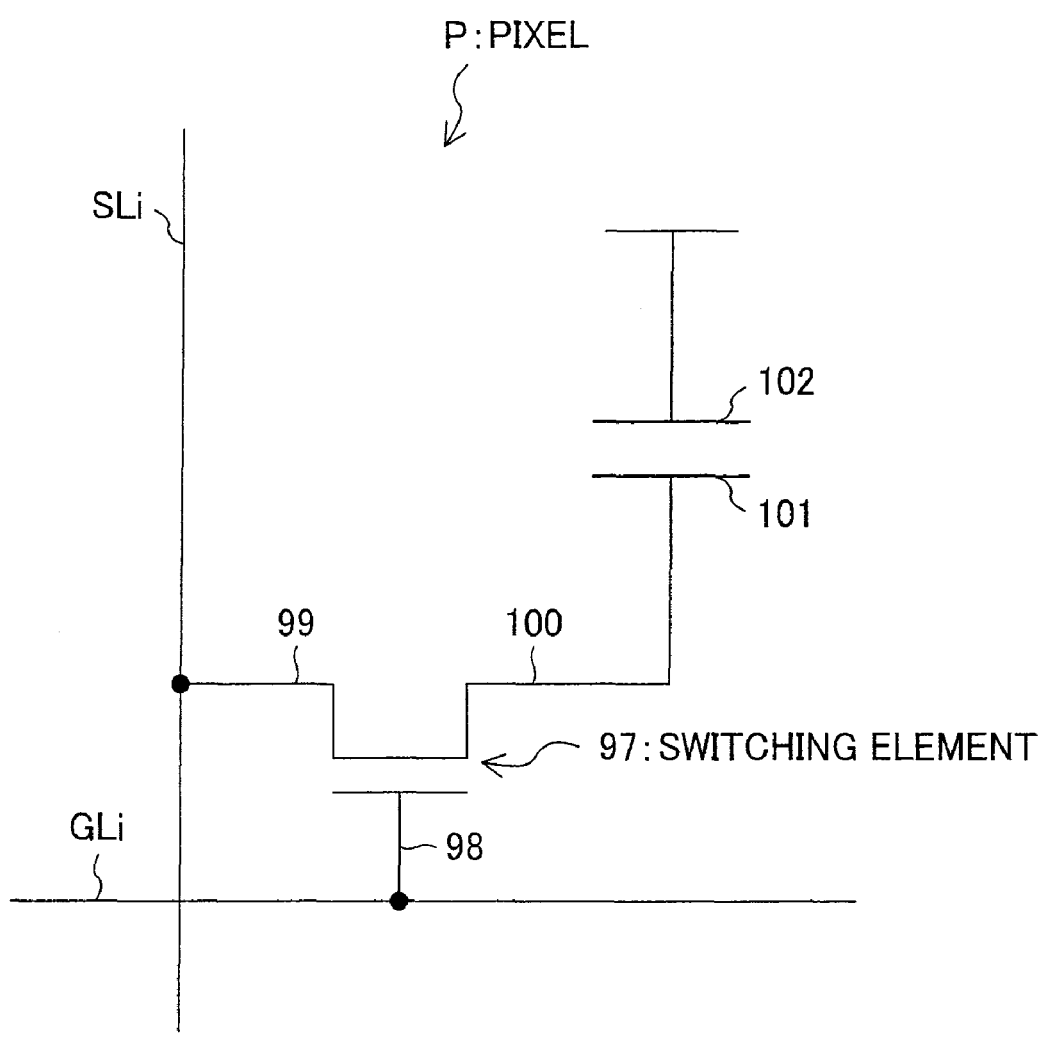
FIG. 4 illustrates a preferred embodiment of the present invention, and is an explanatory diagram schematically illustrating the structure of each pixel.

Here, the following explains the display panel 10 with reference to FIG. 3 and FIG. 4. FIG. 3 is a block diagram schematically illustrating the configuration of the display panel 10. As shown in FIG. 3, the display panel 10 includes the TFT substrate 11 on which pixels P are arranged in a matrix manner, a source driver 94 and a gate driver 95 each serving as a driving circuit, and a power supply circuit 96, and a control section 91.

Provided on the TFT substrate 11 are a plurality of data signal lines SL1 to SLn (n is an integer not less than 2), and a plurality of scan signal lines GL1 to GLm (m is an integer not less than 2) respectively crossing data signal lines SL1 to SLn. For combinations of the data signal lines SL1 to SLn and scan signal lines GL1 to GLm, the pixels P are provided respectively.

The pixels P form pixel columns in which pixels for displaying images in the same directions are provided in the direction in which the data signal lines SL1 to SLn extend. More specifically, pixel columns L for the driver seat side (for display toward the driver seat side) and pixel columns R for the passenger seat side (for display toward the passenger seat side) are arranged alternately in a direction that is substantially perpendicular to the direction in which the data signal lines SL1 to SLn extend. Each of the pixels is fed with a driving voltage (receives data (signal)) from the source driver and the gate driver such that the pixel displays an image corresponding to its display direction.

The control section 91 controls operations of the source driver 94 and the gate driver 95. Further, the power supply circuit 96 supplies each of the source driver 94 and the gate driver 95 with a voltage for a display operation in the display device 1. The source driver 94 and the gate driver 95 generate driving voltages (signals, data) for causing the pixels P to display images in their corresponding display directions respectively, so as to drive the data signal lines SL1 to SLn and the scan signal lines GL1 to GLm. Further, electrodes 101 for applying electric fields to the pixels P are arranged on the TFT substrate 11 so as to correspond to the pixels P respectively, whereas electrodes 102 are provided on the CF substrate 12 (see FIG. 4; not shown in FIG. 1).

Further, as shown in FIG. 4, each of the pixels P is provided with a switching element 97. As the switching element 97, for example, an FET (field effect transistor), a TFT (thin film transistor), or the like preferably is used. The switching element 97 has a gate electrode 98 connected to a scan signal line GLi (i is an integer not less than 1), has a source electrode 99 connected to a data signal line SLi, and has a drain electrode 100 connected to an electrode 101. Further, each electrode 102 is connected to a common electrode wire (not shown) shared by all the pixels P.

With this, when the scan signal line GLi is selected in each pixel P, the switching element 97 becomes electrically conductive, with the result that a signal voltage determined in accordance with a display data signal sent from a controller (not shown) is applied from the source driver 103 across the electrodes 101 and 102 via the data signal line SLi (i is an integer not less than 1). Ideally, while the switching element is disconnected after the selection period of the scan signal line GLi, the voltage across the electrodes 101 and 102 keeps on being as large as the one upon the disconnection. With this, by independently applying driving voltages across the electrodes 101 and 102 respectively corresponding to the pixels P, electric fields corresponding to images to be displayed on the pixels are applied to pixel regions in the liquid crystal layer, thereby changing alignment states of the liquid crystal molecules in the pixel regions. In this way, the display operation is carried out.

Note that the arrangement of the pixels P is not particularly limited, but it is preferable that pixels P on the left side and pixels P on the right side be arranged symmetrically. Each of the pixels P has a portion in which the switching element 97, the electrode 101, and the like are not provided and light entering the display panel 10 from the backlight is therefore blocked, and has a portion in which the switching element 97 and the like are not provided and the light therefore passes therethrough. Hence, the phrase "pixels P on the left side and pixels P on the right side are arranged symmetrically" indicates that the pixels P are arranged in such a manner that: in cases where the pixels P are divided in two in the direction in which the pixel columns L (or pixel columns R) extend, the area of light transmissive regions in the left half of the pixels P thus divided is substantially as large as the area of light transmissive regions in the right half. With such an arrangement, it is possible to display different images to different viewers with the same luminance (display quality).

Further, the polarizing plate 31 is provided on the backlight-side surface of the TFT substrate 11. Further, on the opposing surfaces of the TFT substrate 11 and the CF substrate 12, there are provided alignment films (not shown) having been subjected to alignment treatments carried out in directions substantially orthogonal to each other, respectively.

Provided on the CF substrate 12 is the color filter layer 13. In the color filter layer 13, subpixels of R, G, and B are provided for each of the pixels. In the present preferred embodiment, each of these subpixels of R, G, and B preferably has a width (distance d in FIG. 1) of about 65 μm, for example. Further, the CF substrate 12 is thinned by a chemical etching treatment or a mechanical treatment such as polishing. Particularly, the display device 1 of a preferred embodiment of the present invention is for DV display, so the CF substrate 12 is thinner than a barrier glass 21.

Note that, in the liquid crystal layer, a photo spacer (not shown) is provided so as to support the TFT substrate 11 and the CF substrate 12 and maintain evenness of the film thickness (gap) of the liquid crystal layer. As the photo spacer, a photo spacer having a pillar shape is preferable. Such a photo spacer having a pillar shape can support the TFT substrate and the CF substrate 12 with its surfaces, so the TFT substrate 11 and the CF substrate 12 are supported more stably.

The barrier section 20 includes the barrier glass 21 and barrier light-blocking sections 22, which are formed on the barrier glass 21. Further, the polarizing plate 32 is provided on the display-surface-side (side opposite to the side in which the backlight is provided) of the barrier glass 21. The barrier glass 21 is adhered to the CF substrate 12 by an adhesive layer 23 such that the surface on which the barrier light-blocking sections 22 are provided faces the CF substrate 12.

That is, the adhesive layer 23 adheres the barrier section 20 and the display panel 10 together, and is therefore preferably formed entirely on the opposing surfaces of the barrier section 20 and the display panel 10. Namely, the barrier section 20 (the surface, on which the barrier light-blocking sections 22 are formed, of the barrier glass 21) and the display panel 10 (CF substrate 12) are adhered to each other entirely. As the adhesive layer 23, for example, a UV-curing adhesive agent (adhesive resin) is preferably used. Note that, in the present preferred embodiment, a space (distance a in FIG. 1) preferably is about 85 μm long, for example, from the color-filter-13-side surface of the CF substrate 12 to the surface, on which the barrier light-blocking sections 22 are provided, of the barrier glass 21.

As described above, the barrier light-blocking sections 22 are provided on the barrier glass 21 in lines in a stripe manner, in parallel or substantially in parallel with the direction in which the pixel columns R and L extend. Further, the lines of the barrier light-blocking sections 22 are arranged so as to correspond to the pixel columns of the display panel 10, respectively. In other words, the lines of the barrier light-blocking sections 22 are provided in such positions that a portion of light coming from the pixel columns of the display panel 10 is blocked and images are not viewed from directions other than the display directions of the pixel columns.

There exists the adhesive layer 23 in portions each sandwiched between the lines of the barrier light-blocking sections 22, that is, there is nothing blocking light coming from each of the pixel columns of the display panel 10. Hence, the portions each sandwiched between the lines of the barrier light-blocking sections 22 work as regions (transmissive sections 24) allowing light to pass therethrough. Light coming from each of the pixel columns of the display panel 10 passes through the transmissive sections 24 and goes to the outside. In other words, the barrier light-blocking sections 22 and the transmissive sections 24 serve as a parallax barrier.

With this, the pixel columns R for the driver seat side are viewable from the driver seat side but are not viewable from the passenger seat side, whereas the pixel columns L for the passenger seat side are viewable from the passenger seat side but are not viewable from the driver seat side. With this, the display device 1 is capable of displaying different images toward the driver seat side and the passenger seat side respectively.

Note that, in the present preferred embodiment, each of the pixel columns for the barrier light-blocking sections 22 preferably has a width (distance b in FIG. 1) of about 94 μm, for example. Note also that, in the present preferred embodiment, the width of each barrier light-blocking section 22 and the width of each transmissive section 24 preferably are about 130 μm, for example, in total (distance c in FIG. 1). Accordingly, each of the transmissive sections 24 preferably has a width of about 36 μm, for example.

Further, in order to appropriately display images toward the driver seat side and the passenger seat side respectively, it is necessary to register (align) the barrier section 20 with the display panel 10 accurately. For accurate registration, it is preferable to register them by using alignment marks provided on the barrier section 20 and the display panel 10.

In each of the barrier light-blocking sections 22, a relationship represented by Formula (2) below is satisfied:

$$\log(1/T) \geq 4 \qquad (2)$$

where T denotes the transmittance for light in the barrier light-blocking section 22. In this formula, log(1/T) represents an OD value, so Formula (2) indicates that the barrier light-blocking section has an OD value of not less than 4.

Here, "OD" is an abbreviation for "Optical Density". The "OD value" is an value indicating a transmittance for light. A material having a larger OD value has a lower transmittance for light and has a higher light blocking property. Namely, the barrier light-blocking section 22 according to a preferred embodiment of the present invention preferably has an OD value of not less than 4, so the barrier light-blocking section 22 has a high light blocking property and therefore sufficiently restrains light from leaking in a direction other than its display direction.

The OD value can be measured by using, e.g., a color filter spectral inspection system (provided by OTSUKA ELECTRONICS CO. LTD). This inspection system can carry out spot measurement with respect to the barrier light-blocking section 22. Apart from the inspection system, any system can be used to measure an OD value as long as it can measure an OD value in a similar way to that of the inspection system.

Note that the barrier light-blocking section 22 is made of a photosensitive resin in which a black pigment is dispersed. However, the material for the barrier light-blocking section 22 is not limited to this, but may be any light blocking material having a transmittance corresponding to the OD value of not less than 4.

The barrier light-blocking sections 22 thus provided restrain image light from leaking in a direction other than its display direction. This makes it possible for the display device 1 according to a preferred embodiment of the present invention to reduce cross talk. Specifically, in the display device 1 of the present invention, a relationship represented by Formula (1) below is satisfied:

$$(Ld-Lb)/Lb \leq 2.5 \quad (1)$$

where "Ld" denotes a luminance in a main viewing direction for a viewer B side when absolute white display is performed (an absolute white image is displayed) in a viewer A side and absolute black display is performed (an absolute black image is displayed) in the viewer B side, and "Lb" denotes a luminance in the main viewing direction for the viewer B side when absolute black display is performed in both the viewer A side and the viewer B side. (Ld−Lb)/Lb in this formula represents "cross talk component ratio", so Formula (1) indicates that the display device of the present invention has a cross talk component ratio of not more than 2.5.

Figure 5:
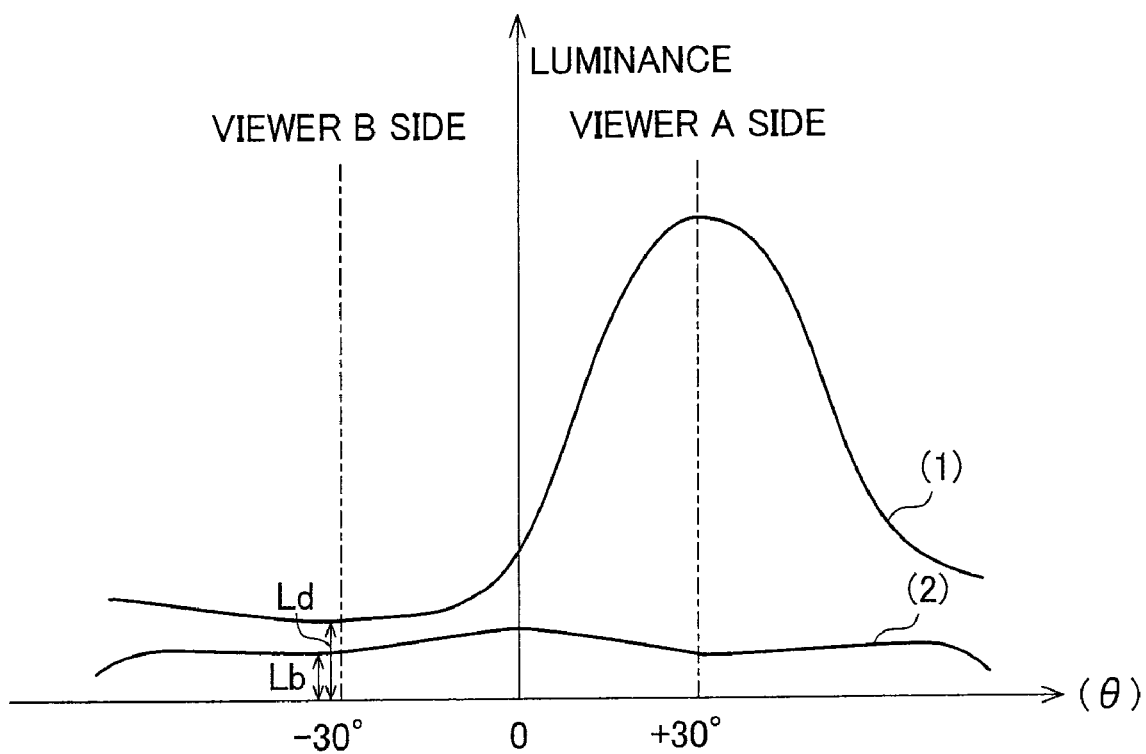
FIG. 5 illustrates a preferred embodiment of the present invention, and is a graph illustrating luminances in cases where images are viewed from different angles.

The following explains the cross talk component ratio with reference to FIG. 5. FIG. 5 is a graph illustrating luminances in cases where images are viewed from different angles. Now, (1) in FIG. 5 represents luminances in all the directions in cases where absolute white display is performed (absolute white image is displayed) in the viewer A side and absolute black display (absolute black image is displayed) in the viewer B side. Meanwhile, (2) in FIG. 5 represents luminances in all the directions in cases where absolute black display is performed in both the viewer A side and the viewer B side. Further, it is assumed in FIG. 5 that the viewer A views the display device from an angle of about +30° with respect to the front of the display device and the viewer B views the display device from an angle of about −30° with respect to the front of the display device. Thus, in the main viewing direction (−30°) of the viewer B, the luminance in the case of (1) corresponds to Ld, and the luminance in the case of (2) corresponds to Lb. Hence, the crosstalk component ratio represents a relationship between the luminance of an image supposed to be displayed for a certain viewpoint and the luminance of an image supposed not to be displayed therefor. Note that the main viewing direction refers to a direction (angle) in which a luminance peak is obtained in cases where luminances are measured at angles during a display operation of the absolute white image. In FIG. 5, the main viewing direction for the image to be displayed for the viewer A is a direction of +30°, whereas the main viewing direction for an image to be displayed for the viewer B is a direction of −30°.

Figure 6:
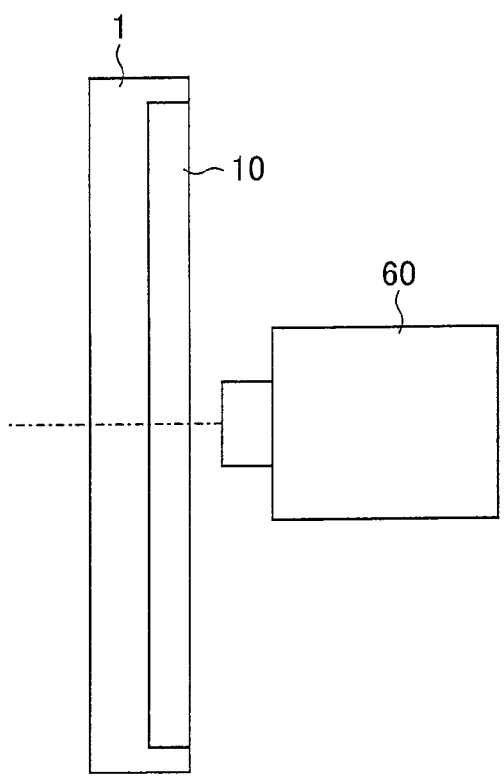
FIG. 6 illustrates a preferred embodiment of the present invention, and is a cross sectional view schematically illustrating how to measure the luminances.

The luminances can be measured by using, e.g., EZ-CONTRAST (provided by ELDIM). FIG. 6 is a cross sectional view schematically illustrating how the luminances are measured by using the measuring device. As shown in FIG. 6, the measuring device 60 is positioned to face the central portion of the display panel 10 of the display device 1 and measures the luminances in all the directions with respect to the display panel 10. Among the measured luminances, the found values of the luminances in the main viewing direction under the different circumstances such as the case of (1) and the case of (2) are used to find the cross talk component ratio. Note that, apart from the measuring device, any device can be used as a device for measuring luminances, as long as it can measure luminances in a similar way to that of the aforesaid measuring device.

Figure 7:
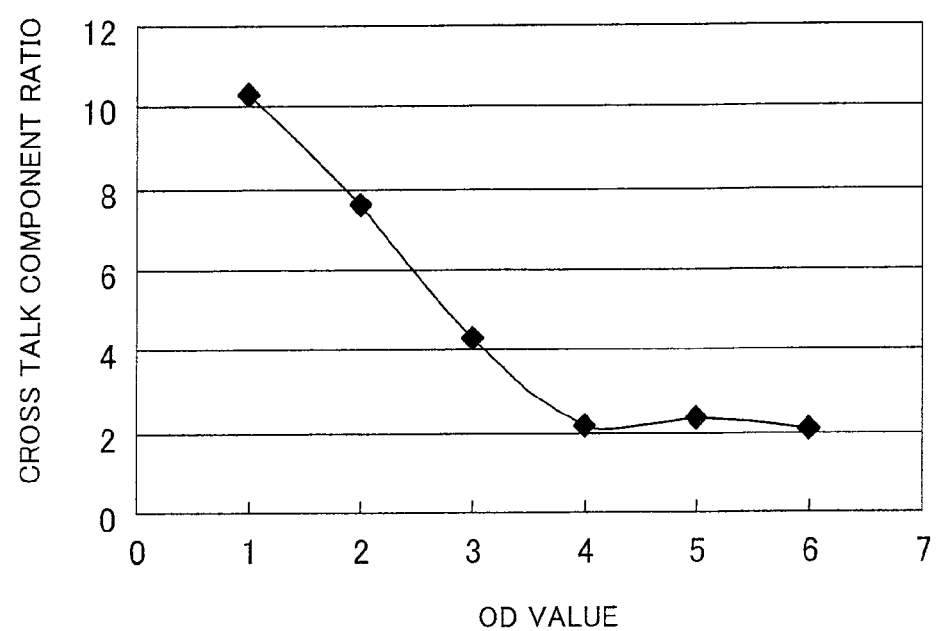
FIG. 7 illustrates a preferred embodiment of the present invention, and is a graph illustrating a relationship between an OD value and a cross talk component ratio.

Here, the following explains a relationship between the cross talk component ratio and the OD value, with reference to Table 1 and FIG. 7. Table 1 is a table showing how the value of the cross talk component ratio changes according to changes of the OD value of the barrier light-blocking section 22. FIG. 7 is a graph converted from Table 1.

TABLE 1

| OD value | Cross talk component ratio |
| --- | --- |
| 1 | 10.3 |
| 2 | 7.6 |
| 3 | 4.3 |
| 4 | 2.2 |
| 5 | 2.3 |
| 6 | 2.1 |

As shown in Table 1 and FIG. 7, when each of the barrier light-blocking sections 22 has an OD value of 1, the cross talk component ratio is 10.3. When the barrier light-blocking section 22 has an OD value of 2, the cross talk component ratio is 7.6. When the barrier light-blocking section 22 has an OD value of 3, the cross talk component ratio is 4.3.

When the barrier light-blocking section 22 has an OD value of 4, the cross talk component ratio is 2.2. When the barrier light-blocking section 22 has an OD value of 5, the cross talk component ratio is 2.3. When the barrier light-blocking section 22 has an OD value of 6, the cross talk component ratio is 2.1.

Even when images causing the most noticeable cross talk are displayed (e.g., when black display is performed in one side (driver seat side) and an image from a DVD or the like is displayed on the other side (passenger seat side)), cross talk cannot be recognized by human eyes as long as the cross talk component ratio is not more than 2.5. That is, when the barrier light-blocking section 22 has an OD value of not less than 4, it is possible to reduce the cross talk to such a degree that the cross talk is unrecognizable.

In some case, a portion of light emitted from the backlight is reflected by the barrier light-blocking section 22. The light thus reflected is further reflected by the CF substrate 12 and the like, and then goes out of the display device 1 (multiple reflections). In this case, the light that should be blocked goes out of the display device 1, thereby causing cross talk.

Meanwhile, in some cases, light enters the display device 1 from outside. However, the light thus entering from outside is reflected by the barrier light-blocking section 22, and then is likely to go out of the display device 1 (outside light reflection). In this case, the screen of display device 1 "shines" (the screen becomes shinny), with the result that display quality is deteriorated notably.

Therefore, it is preferable that the barrier light-blocking section 22 according to a preferred embodiment of the present invention have a surface having a light reflectivity of not more than about 20%. The surface of the barrier light-blocking section 22 has a light reflectivity of not more than about 20%, when the intensity S of light irradiated onto the barrier light-blocking section 22 and the intensity S' of light reflected by the barrier light-blocking section 22 satisfy a relationship represented by the following Formula (3):

$$S'/S \leq 0.2 \qquad (3)$$

To obtain such a barrier light-blocking section 22, a material having an OD value of not less than 4 and having a light reflectivity of not more than about 20% may preferably be used, for example. Alternatively, a material having an OD value of not less 4 may be used to form a barrier light-blocking section 22 and the barrier light-blocking section 22 thus formed may be subjected to a surface treatment so as to have a light reflectivity of not more than about 20%, for example.

Further, the barrier light-blocking section 22 preferably is made of a material having an OD value of not less than 4, but the present invention is not limited to this. The barrier light-blocking section 22 may be made up of two or more light-blocking layers, each having an OD value of less than 4, such that all the barrier light-blocking layers (barrier light-blocking section) have an OD value of not less than 4 in total. By adopting such a structure, it is possible to utilize an existing light blocking film (OD value of 2 or so) used for a color filter. Further, such a structure can be manufactured by using existing color filter manufacturing technique and device.

Figure 8:
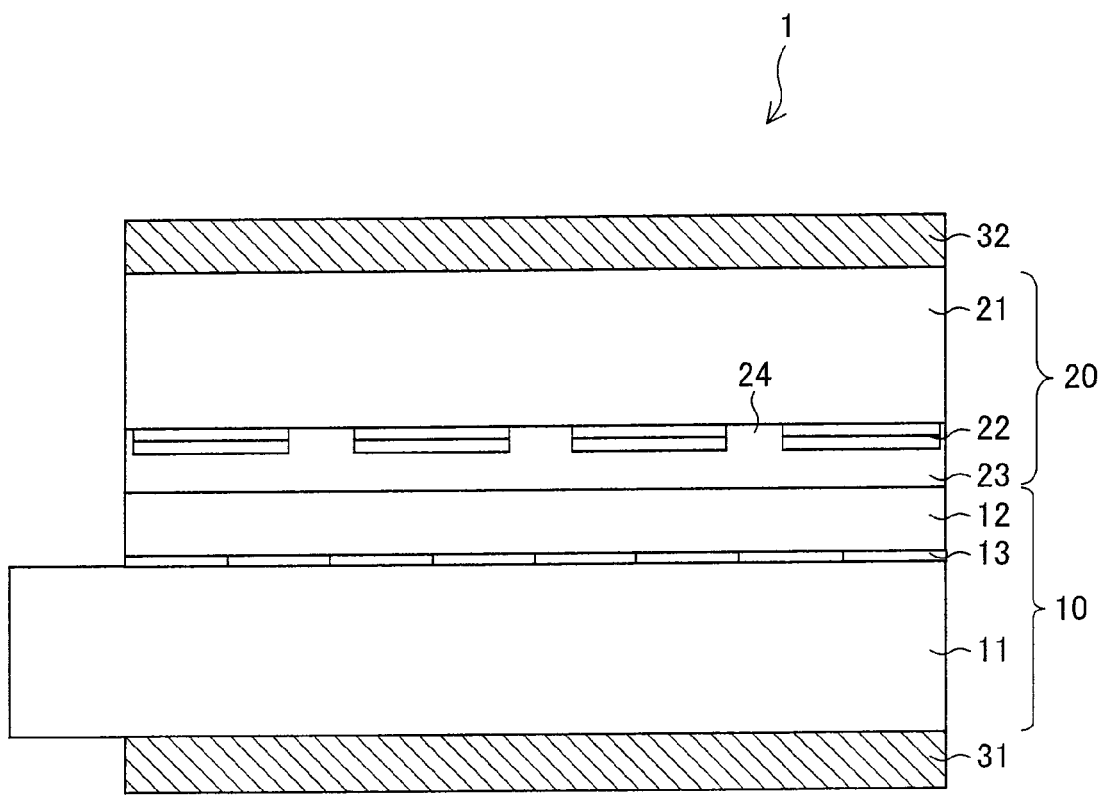
FIG. 8 illustrates a preferred embodiment of the present invention, and is a cross sectional view schematically illustrating the structure of the display device.

FIG. 8 is a cross sectional view schematically illustrating the structure of a display device 1 in which the barrier light-blocking section 22 is made up of two barrier light-blocking layers. As shown in FIG. 8, for example, the barrier light-blocking section may be constituted by two barrier light-blocking layers each made of a material having an OD value of 2. In this case, the entire barrier light-blocking section has an OD value of not less than 4, thus attaining the same effect as that of the case where the barrier light-blocking section is made of a material having an OD value of not less than 4.

Further, in the case where the barrier light-blocking section is made up of, e.g., two barrier light-blocking layers, the barrier light-blocking layers may have different widths. Specifically, the width of the second barrier light-blocking layer formed on the first barrier light-blocking layer may be smaller than the width of the first barrier light-blocking layer formed on the barrier glass 21. With this structure, it is possible to prevent displacement in aligning and adhering the barrier section 20 with the display panel 10.

Further, in cases where the barrier light-blocking section is made up of not less than three barrier light-blocking layers, higher layers may have smaller widths. Alternatively, the width of the uppermost barrier light-blocking layer may be smaller than the width of each of the other barrier light-blocking layers.

Note that, it is preferable that the barrier glass 21 and the CF substrate 12 be made of materials whose thermal expansion coefficients substantially coincide with each other. In cases where the barrier glass 21 and the CF substrate 12 are made of materials whose thermal expansion coefficients substantially coincide with each other, the barrier glass 21 and the CF substrate 12 expand and contract in the same way according to changes in temperature. A preferable example of such materials is non-alkali glass. The use of the non-alkali glass makes it possible to prevent air bubbles from being introduced into the glass during a manufacturing process.

Further, it is preferable that the adhesive agent used for the adhesive layer 23 adhering the barrier section 20 and the display panel 10 together have a refractive index substantially coinciding with the refractive index of the barrier glass 21 and the refractive index of the CF substrate 12. With the refractive indexes thereof substantially coinciding with one another, it is possible to prevent light from being refracted in an unintended direction.

Note that the display device 1 can be manufactured by using the below-described method. However, a conventional manufacturing method can be utilized for steps not described below.

First, the display panel 10 and the barrier section 20 are manufactured in advance. The barrier section 20 is manufactured in accordance with the following procedure. That is, the barrier light-blocking sections 22 are provided on one surface of the CF substrate 12 constituted by a glass substrate or the like. The barrier light-blocking sections 22 are formed by (i) forming on the CF substrate 12 a film made of a light blocking material (such as a resin) and having a predetermined thickness, and (ii) patterning the film thus formed.

Note that, because the display device 1 is for DV display, it is preferable that the CF substrate 12 be thinner. In a preferred embodiment of the present invention, the CF substrate 12 is thinned more by chemical etching, mechanical polishing, or mechanical grinding.

Figure 9:
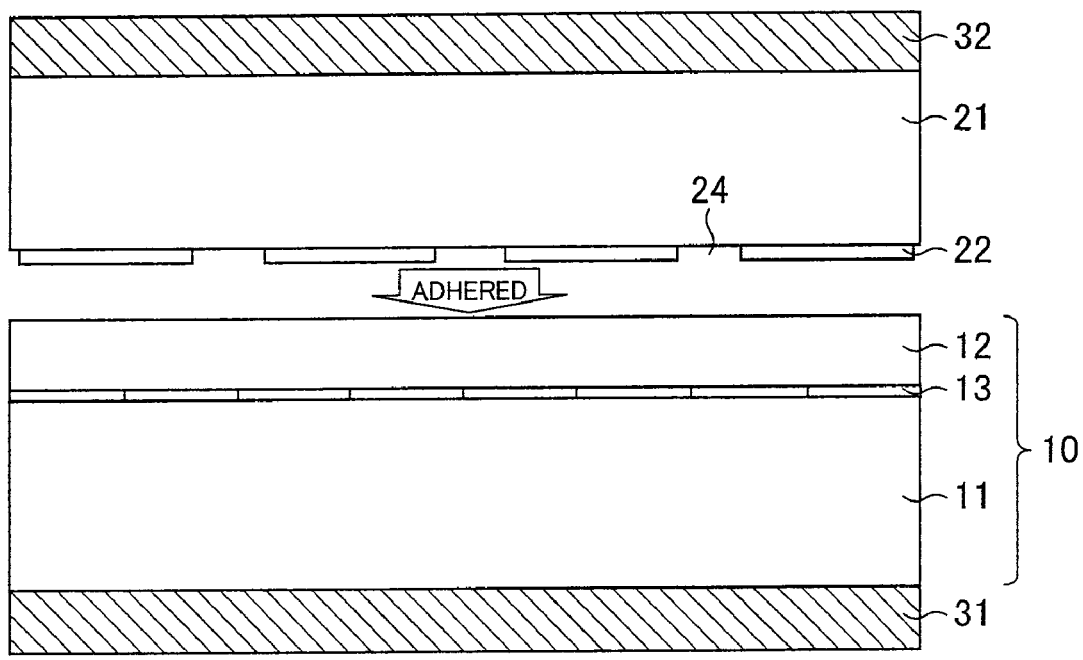
FIG. 9 illustrates a preferred embodiment of the present invention, and is a cross sectional view illustrating how to adhere a CF substrate and a barrier glass to each other.

After forming the barrier section 20, the display panel 10 and the barrier section 20 are adhered to each other by (i) printing an adhesive UV-curing resin on the entire surface of either one substrate of the CF substrate 12 and the barrier glass 21 and (ii) adhering them to each other in vacuum under a reduced pressure as shown in FIG. 9.

It is preferable to register the display panel 10 with the barrier section 20 in accordance with the alignment marks provided on these substrates and adhere them to each other.

Thereafter, ultraviolet rays are irradiated to the adhesive UV-curing resin so as to cure the resin, thereby adhering and bonding the display panel 10 and the barrier section 20 with each other.

The display device having the above structure is capable of respectively displaying different images toward a plurality of different viewpoints without occurrence of cross talk. Namely, with the above structure, a display device displays different images for different angles with good quality without occurrence of cross talk.

Especially, in a display device for DV display such as the one according to various preferred embodiments of the present invention, glass substrates used for a CF substrate and a barrier glass are thinner than those in a display device for 3D display, so cross talk occurs with ease in the display device for DV display. Meanwhile, 3D display is to display substantially the same two images to one viewer, whereas DV display is to display different images to different viewers respectively. Hence, cross talk posing no problem in a display device for 3D display causes a problem in a display device for DV display. However, the structure of the present invention makes it possible to realize cross talk posing no problem upon DV display.

Further, the display device for DV display displays different images to different viewpoints respectively as described above, but may display the same image to different viewpoints (viewers viewing from different angles). For example, the same image is displayed toward the driver seat side and the passenger seat side.

Figure 10:
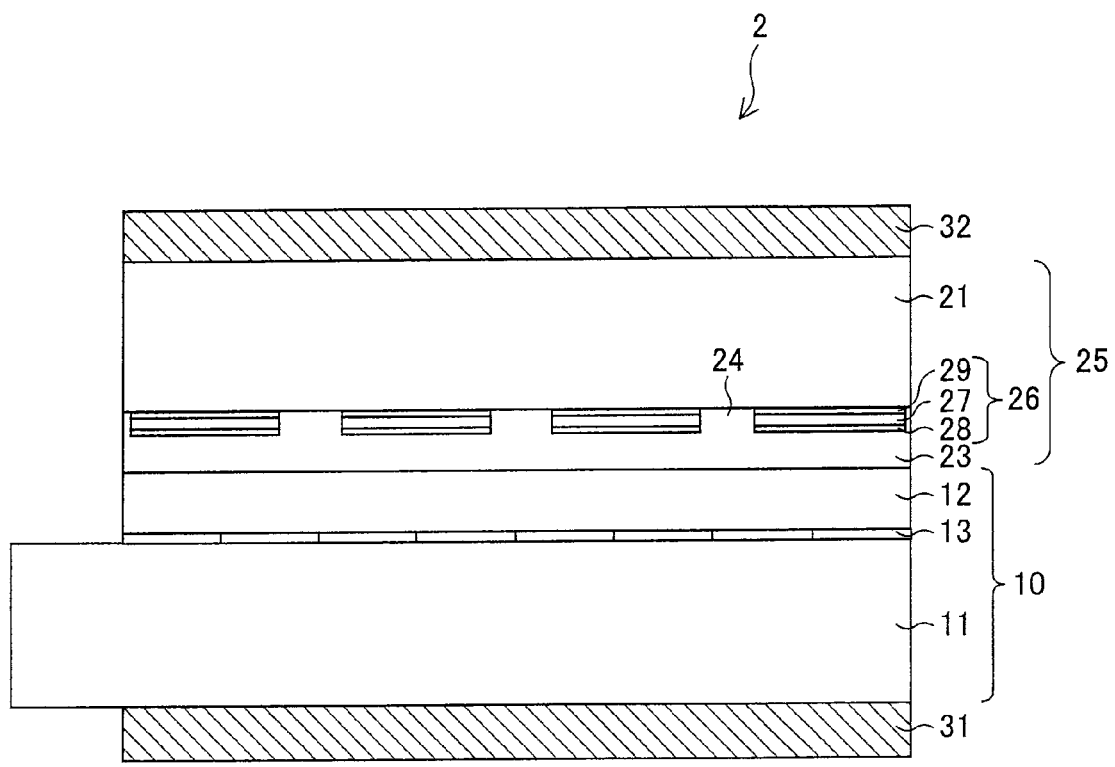
FIG. 10 illustrates another preferred embodiment of the present invention, is a cross sectional view schematically illustrating the structure of a display device.
Figure 11:
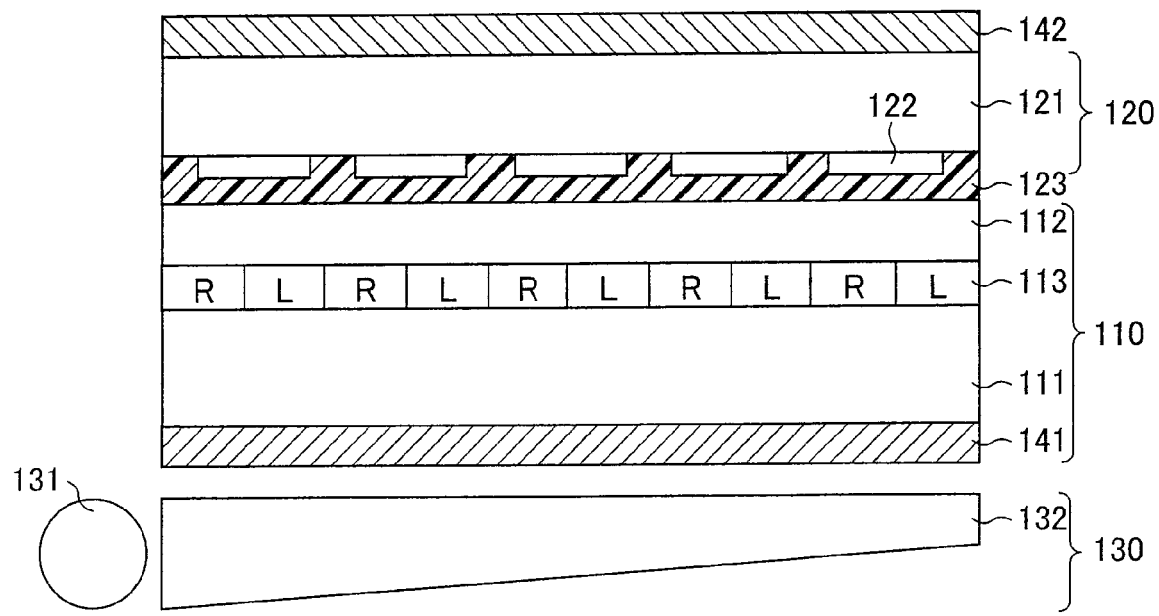
FIG. 11 is a cross sectional view schematically illustrating the structure of a conventional display device.

The following explains a second preferred embodiment of the present invention with reference to FIG. 10. For ease of explanation, members having functions equivalent to those of the members described in the first preferred embodiment are illustrated with the same reference numerals as those in the first preferred embodiment, and explanation thereof is omitted. Further, the structure in the present preferred embodiment is the same as that in the first preferred embodiment apart from the barrier section. Hence, in the present preferred embodiment, the following mainly explains the structure of the barrier section.

FIG. 10 is a cross sectional view schematically illustrating the structure of a display device 2 according to the present preferred embodiment. As shown in FIG. 10, the display device 2 includes a display panel 10, a barrier section 25, and polarizing plates 31 and 32. Further, the display device 2 is provided with a backlight (not shown), which irradiates light onto the display panel 10.

The barrier section 25 includes a barrier glass 21 and barrier light-blocking sections 26, which are formed on the barrier glass 21. The barrier glass 21 is adhered to the CF substrate 12 by an adhesive layer 23 in such a manner that the surface on which the barrier light-blocking sections 26 are provided faces the CF substrate 12. As is the case with the first preferred embodiment, it is preferable that the barrier glass 21 be made of a material having a thermal expansion coefficient substantially coinciding with that of the CF substrate 12, or a material having a refractive index substantially coinciding with those of the CF substrate 12 and the adhesive layer 23. A specific example of such materials is non-alkali glass.

As is the case with the first preferred embodiment, the barrier light-blocking sections 26 are arranged in lines in a stripe manner on the barrier glass 21, in parallel or substantially in parallel with a direction in which pixel columns R and L extend. Further, the lines of the barrier light-blocking sections 26 are formed so as to correspond to the pixel columns of the display panel 10, respectively. That is, the lines of the barrier light-blocking sections 26 are provided in such positions that a portion of light coming from the pixel columns of the display panel 10 is blocked and images are not viewed from directions other than the display directions of the pixel columns.

With this, the pixel columns R for the driver seat side are viewable from the driver seat side but are not viewable from the passenger seat side, whereas the pixel columns L for the passenger seat side are viewable from the passenger seat side but are not viewable from the driver seat side. With this, the display device 1 is capable of displaying different images toward the driver seat side and the passenger seat side respectively.

Each of the barrier light-blocking sections 26 includes a light blocking layer 27, a first light absorbing layer 28, and a second light absorbing layer 29. The first light absorbing layer 28 is provided on the CF substrate 12 side surface of the light blocking layer 27, and the second light absorbing layer 29 is provided on the barrier glass 21 side surface of the light blocking layer 27. That is, the barrier light-blocking section 26 is structured such that the light blocking layer 27 is sandwiched between the first light absorbing layer 28 and the second light absorbing layer 29.

The light blocking layer 27 is arranged to block light emitted from the backlight, and preferably is a layer made of a metal. The first light absorbing layer 28 is a layer to prevent light, emitted from the backlight, from being reflected by the light blocking layer 27. The second light absorbing layer 29 is a layer to prevent light, having entered from the outside to the display device 1, from being reflected by the light blocking layer 27.

If the first light absorbing layer 28 and the second light absorbing layer 29 are not provided, for example, the light blocking layer 27 made of a metal blocks a portion of light emitted from the backlight but reflects a portion of the light, with the result that the light supposed to be blocked goes out of the display device 1. This causes cross talk. Moreover, such a light blocking layer 27 reflects light entering from outside, with the result that the screen of the display device 1 "shines". This results in noticeable deterioration of display quality. In order to prevent these, the barrier light-blocking section 26 of the present preferred embodiment is provided with the first light absorbing layer 28 and the second light absorbing layer 29. That is, the first light absorbing layer 28 and the second light absorbing layer 29 according to a preferred embodiment of the present invention absorb this light. However, the layers provided in the barrier light-blocking section 26 are not limited to layers absorbing light, as long as the layers have a function of preventing reflection of light.

It is preferable that each of the first light absorbing layer 28 and the second light absorbing layer 29 has a surface whose light reflectivity is not more than about 20%. The light reflectivity of the surface thereof is not more than about 20% when the intensity S of light irradiated onto each of the first light absorbing layer 28 and the second light absorbing layer 29, and the intensity S' of light reflected by each of the first light absorbing layer 28 and the second light absorbing layer 29 satisfy a relationship represented by the following Formula (3):

$$S'/S \leqq 0.2 \tag{3}$$

With this, it is possible to prevent the barrier light-blocking section from unnecessarily reflecting light.

Further, each of the light blocking layer 27, the first light absorbing layer 28, and the second light absorbing layer 29 may be made of such a material that the barrier light-blocking section 26 constituted by these layers has an OD value of not less than 4. For example, the metal of which the light blocking layer 27 is made may have an OD value of not less than 4, or the OD values of the light blocking layer 27, the first light absorbing layer 28, and the second light absorbing layer 29 may be not less than 4 in total. Each of the first light absorbing layer 28 and the second light absorbing layer 29 can be made of, e.g., a resin.

Further, by providing the barrier light-blocking section 26, it is possible to restrain image light from leaking in a direction other than its display direction, and to attain a cross talk component ratio of not more than about 2.5. Note that OD values and luminances can be measured in accordance with the same methods as those of the first preferred embodiment.

Further, in the present preferred embodiment, the first light absorbing layer 28 and the second light absorbing layer 29 preferably are provided on the light blocking layer 27; however, the present invention is not limited to this. Instead of providing them, the light blocking layer 27 may be surface-treated so as to have a light reflectivity of not more than about 20%.

Note that, also in the present preferred embodiment, in order to appropriately display images toward the driver seat side and the passenger seat side respectively, it is preferable to register the barrier section 20 with the display panel 10 by using alignment marks provided therein for the sake of accurate registration.

The display device according to the present preferred embodiment can be manufactured in the same way as with the first preferred embodiment. However, the barrier section 26 preferably is manufactured in accordance with the following procedure. That is, the barrier light-blocking section 26 is formed on one surface of the CF substrate 12 constituted by a glass substrate or the like.

The barrier light-blocking section 26 is formed as follows. That is, the second light absorbing layer 29 is provided by (i) forming on the surface of the CF substrate a film made of a light absorbing (light reflection preventing) material such as a resin and having a predetermined thickness, and (ii) patterning the film thus formed. Next, on second light absorbing layer 29, the metal is provided, thereby forming the light blocking layer 27. The formation of the light blocking layer 27 is attained by evaporating the metal. Then, on the light blocking layer 27, the first light absorbing layer 27 is formed by (i) forming a film made of a light absorbing (light reflection preventing) material such as a resin and having a predetermined thickness, and (ii) patterning the film thus formed.

In this way, the barrier section 26 is formed. After the formation of the barrier section 20, the display panel 10 and the barrier section 26 are adhered to each other by the UV-curing resin. With this, the display panel 10 and the barrier section 20 are adhered to each other.

Note that, it is preferable that the CF substrate 12 be formed to be thinner. Further, it is preferable to register the display panel 10 and the barrier section 20 with each other in accordance with the alignment marks formed on these substrates and adhere them to each other.

Preferred embodiments of the present invention being thus described, it will be obvious that the same way may be varied in many ways. Such variations are not to be regarded as a departure from the spirit and scope of the present invention, and all such modifications as would be obvious to one skilled in the art are intended to be included within the scope of the following claims.

A display device according to various preferred embodiments of the present invention is capable of displaying different images to a plurality of different viewpoints and preventing occurrence of cross talk. Therefore, the display device according to various preferred embodiments of the present invention is widely applicable to various types of display such as that in a navigation system used in an automobile. Accordingly, various preferred embodiments of the present invention are suitably usable for a wide range of industrial fields requiring a display, such as a consumer electronics industry, an automobile industry, and a machine industry.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device, which is arranged to display different images to a plurality of different viewpoints, comprising:
    an image generating unit arranged to generate the images and to emit light beams corresponding to the images thus generated; and
    a parallax barrier including a transmissive section through which the light beams emitted from the image generating unit and heading in a particular direction pass, and a barrier light-blocking section which blocks the light beams heading in directions other than said particular direction; wherein
    the display device has a structure such that, in cases where a first image is an absolute white image, a direction in which a luminance is maximum being regarded as a main viewing direction for the first image, a luminance Ld in the main viewing direction for the first image in cases where the first image is an absolute black image and other image is an absolute white image, and a luminance Lb in the main viewing direction for the first image in cases where the first image and the other image are absolute black images satisfying a relationship represented by the following formula:

$(Ld-Lb)/Lb \leq 2.5$; and a relationship represented by the following formula is satisfied:

$\log(1/T) \geq 4$ where T denotes a transmittance of the barrier light-blocking section for the light beams.

2. A display device, which is capable of displaying a first image and a second image to a plurality of different viewpoints, having a structure such that, in cases where the first image is an absolute white image, a direction in which a luminance is maximum being regarded as a main viewing direction for the first image, a luminance Ld in the main viewing direction for the first image in cases where the first image is an absolute black image and the second image is an absolute white image, and a luminance Lb in the main viewing direction of the first image in cases where the first image and the second image are absolute black images satisfying a relationship represented by the following formula:

$(Ld-Lb)/Lb \leq 2.5$;

the display device further comprising:
    an image generating unit arranged to generate the first image and the second image and emitting light beams corresponding to the images thus generated; and
    a parallax barrier including a transmissive section through which a light beam having been emitted from the image generating unit and heading in a particular direction pass, and a barrier light-blocking section which blocks light beams heading in directions other than said particular direction; wherein
    a relationship represented by the following formula is satisfied:

$\log(1/T) \geq 4$ where T denotes a transmittance of the barrier light-blocking section for the light beams.

3. A display device, which is capable of displaying different images to a plurality of different viewpoints, comprising:
    an image generating unit arranged to generate the images and emitting light beams corresponding to the images thus generated; and
    a parallax barrier including a transmissive section through which a light beam having been emitted from the image generating unit and heading in a particular direction pass, and a barrier light-blocking section which blocks light beams heading in directions other than said particular direction; wherein
    said barrier light-blocking section is made of a resin;
    a relationship represented by the following formula is satisfied:

$\log(1/T) \geq 4$ where T denotes a transmittance of the barrier light-blocking section for the light beams; and a relationship represented by the following formula is satisfied:

$$S'/S \leq 0.2$$

where S denotes an intensity of a light beam irradiated onto the barrier light-blocking section, and S' denotes an intensity of a light beam reflected by the barrier light-blocking section.

4. A display device, which is capable of displaying a first image and a second image to a plurality of different viewpoints, comprising:

an image generating unit arranged to generate the first image and the second image and emitting light beams corresponding to the images thus generated; and a parallax barrier including a transmissive section through which a light beam having been emitted from the image generating unit and heading in a particular direction pass, and a barrier light-blocking section which blocks light beams heading in directions other than said particular direction; wherein said barrier light-blocking section is made of a resin;

a relationship represented by the following formula is satisfied:

$$\log(1/T) \geq 4$$

where T denotes a transmittance of the barrier light-blocking section for the light beams; and a relationship represented by the following formula is satisfied:

$$S'/S \leq 0.2$$

where S denotes an intensity of a light beam irradiated onto the barrier light-blocking section, and S' denotes an intensity of a light beam reflected by the barrier light-blocking section.

5. The display device as set forth in claim 1, wherein a relationship represented by the following formula is satisfied:

$$S'/S \leq 0.2$$

where S denotes an intensity of a light beam irradiated onto the barrier light-blocking section, and S' denotes an intensity of a light beam reflected by the barrier light-blocking section.

6. The display device as set forth in claim 2, wherein a relationship represented by the following formula is satisfied:

$$S'/S \leq 0.2$$

where S denotes an intensity of a light beam irradiated onto the barrier light-blocking section, and S' denotes an intensity of a light beam reflected by the barrier light-blocking section.

* * * * *